Feb. 23, 1943.  W. N. PATTERSON  2,312,187
WINDSHIELD PROTECTOR AND CLEANER FOR AIRPLANES
Filed Aug. 29, 1941  2 Sheets-Sheet 1
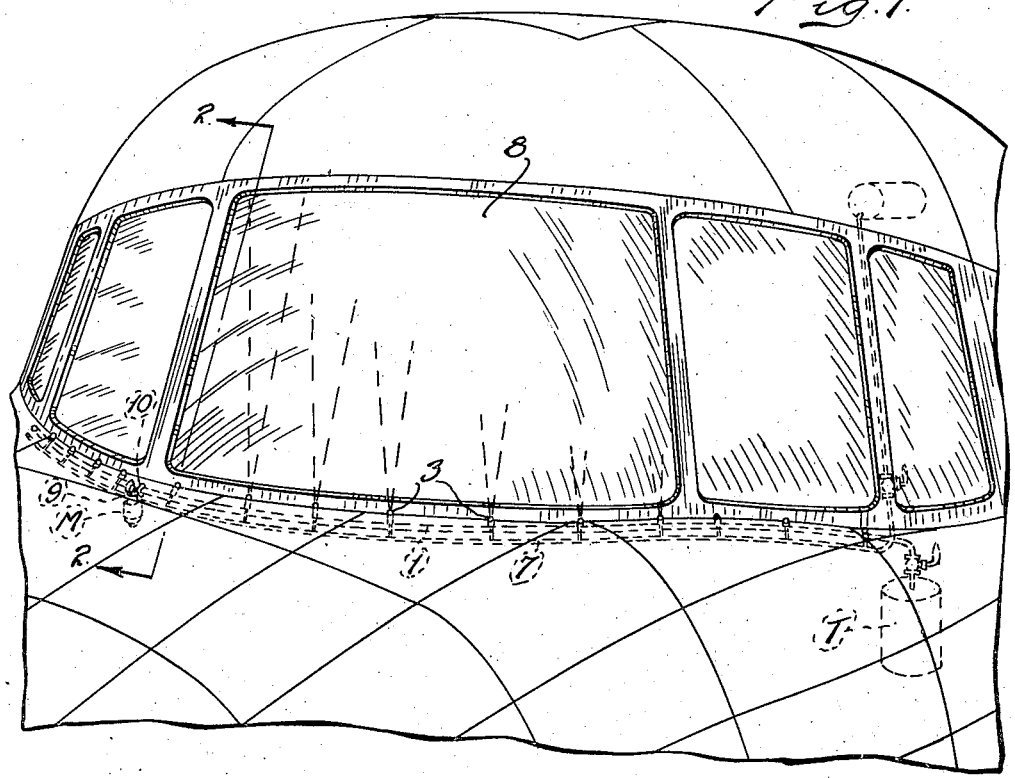
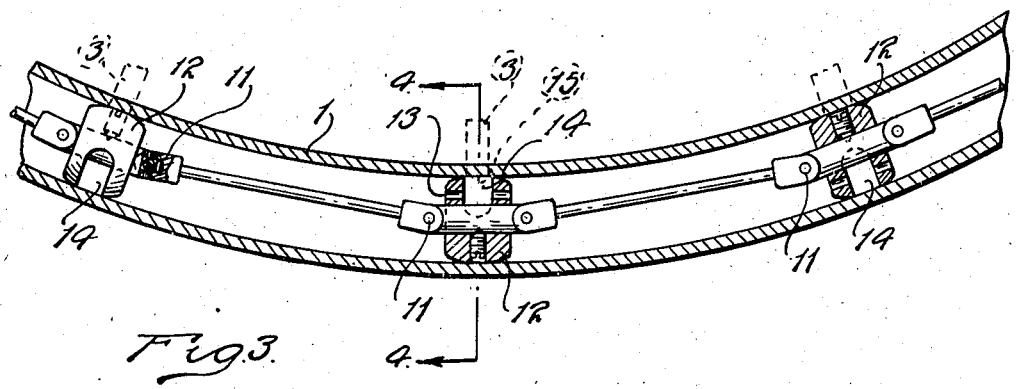
INVENTOR.
WILLIAM N. PATTERSON
BY
Barnes, Kisselle, Laughlin & Raisch
ATTORNEYS.

Feb. 23, 1943.   W. N. PATTERSON   2,312,187
WINDSHIELD PROTECTOR AND CLEANER FOR AIRPLANES
Filed Aug. 29, 1941   2 Sheets-Sheet 2
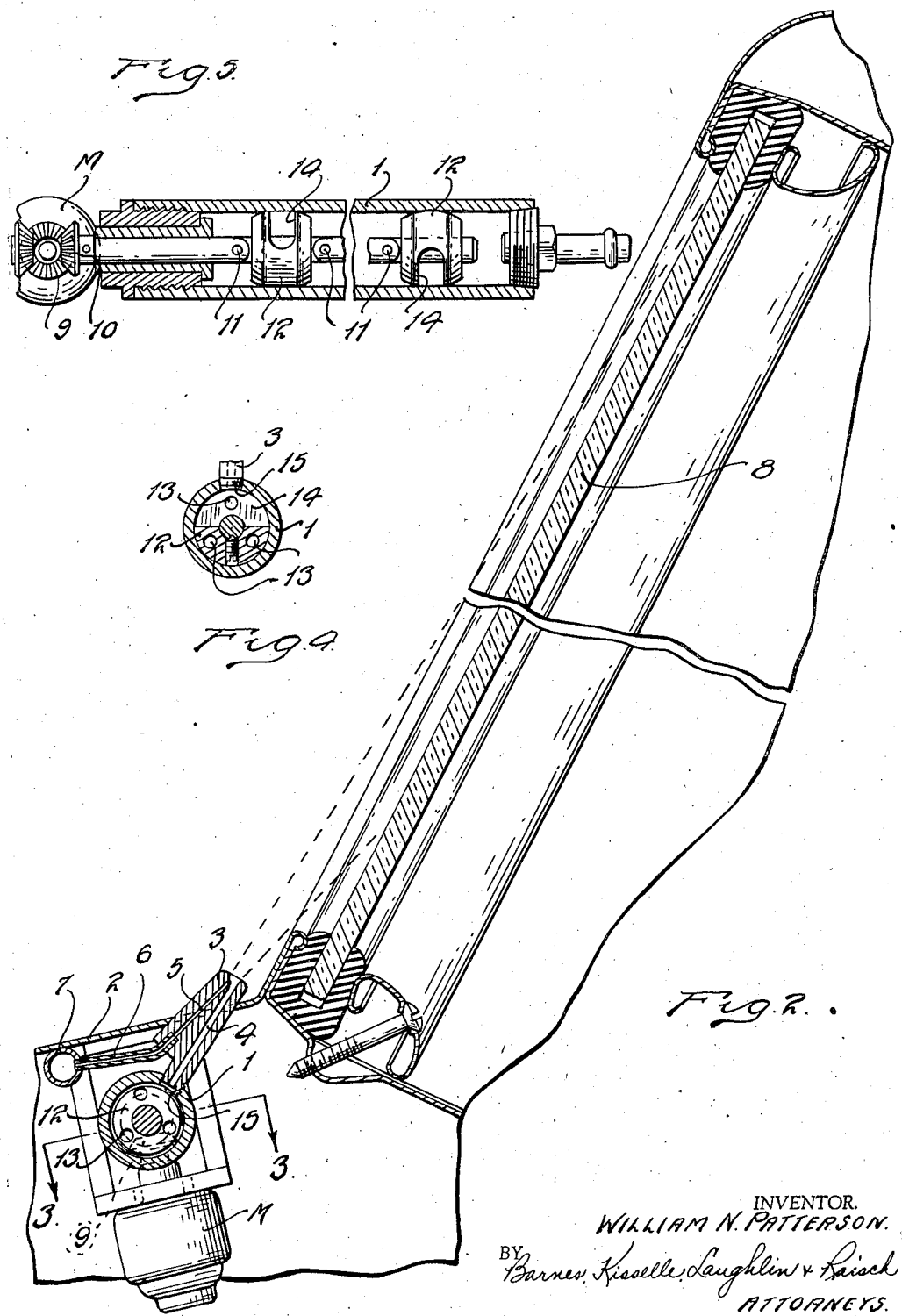

Patented Feb. 23, 1943

2,312,187

UNITED STATES PATENT OFFICE 2,312,187

WINDSHIELD PROTECTOR AND CLEANER FOR AIRPLANES

William N. Patterson, Detroit, Mich., assignor to Patterson Industries Incorporated, Detroit, Mich., a corporation of Michigan Application August 29, 1941, Serial No. 408,872

6 Claims. (Cl. 20—40.5)

This invention relates to windshield protectors and cleaners, particularly for high speed vehicles such as airplanes.

In a copending application Serial No. 408,778, filed August 29, 1941, I have described and claimed a windshield cleaner and protector which uses a rotating set of radial high velocity jets of air or air and liquid for protecting the shield against the deposition of rain, snow, ice, etc.

This improvement is a windshield protector and cleaner which is especially adapted to be used in connection with curved windshields. My other improvement is not very well adapted for curved windshields, for the reason that it delivers a curtain of high pressure fluid which must necessarily be in one plane, on account of the rotating distributor.

It is the object of the present invention to provide a windshield cleaner operating with high velocity jets, which is adapted for a curved shield and which affords non-continuous jets to prevent a vacuum adjacent the jets.

Referring to the drawings:

Fig. 1 is a fragmentary elevation of an airplane equipped with my improved windshield protector and cleaner.

Fig. 2 is a section on the line 2—2 of Fig. 1.

Fig. 3 is a section on the line 3—3 of Fig. 2.

Fig. 4 is a section on the line 4—4 of Fig. 1.

Fig. 5 is a longitudinal section through the distributing tube.

The air distributing tube 1 is located below the cowl 2. This is provided with a plurality of nipples 3 which screw into the side of the tube 1 and are provided each with an air nozzle 4 and a liquid nozzle 5. The liquid nozzle 5 joins the air nozzle 4 at an acute angle near the mouth of the nozzle. The liquid nozzle is connected by conduit 6 with a pipe 7 which furnishes alcohol or some other non-freezing liquid. These nipples 3 direct a stream of air or stream of air and liquid across windshield 8 and substantially parallel therewith. Motor M drives gears 9 which operate the driving shaft 10 which is provided with suitable universal joints 11. This is necessary because the distributing tube is curved or arcuate in order to fit around the arcuate windshield 8. Air is furnished under high pressure, say one hundred and fifty pounds per square inch, from a tank T, or it may be furnished by a suitable pump.

On the flexible drive shaft 10 are located a plurality of rotating valves 12. A passageway 13 passes through each valve and through the port chamber 14. These valves have the port chambers of adjoining valves located 180° removed one from the other, as shown in Fig. 3. Hence, when the shaft is rotated, the port chamber which extends substantially 180° around the valve, will register with the port 15 into which is screwed the nipple 3, during one half of a revolution, and, consequently, the operation of adjoining jets will be staggered. Jet No. 1 will be on for half a turn of the shaft, then cease, and jet No. 2 will come on for half a turn of the shaft, while jet No. 1 is shut off, and so the arrangement is all along the line of jets. The purpose of this is to periodically alternate the jets so as to break down the vacuum which would otherwise occur if a jet were to operate continuously. By intermittently operating the jets, little or no vacuum is built up to pull rain, dirt, smoke, and other material onto the shield. This, in quite a different way, accomplishes the same purpose which is accomplished in my application first above referred to, by means of having one jet of a rotating distributor in communication with the fluid during only half a turn of the distributor.

What I claim is:

1. In a windshield protector and cleaner, the combination of a stationary distributing tube provided with a plurality of nozzles for delivering high velocity jets across and substantially parallel to a windshield, and valve means rotatable in said tube for opening and cutting off the supply of high pressure fluid to said jets in alternate sequence.

2. In a windshield protector and cleaner, the combination of a stationary distributing tube provided with a plurality of nozzles for delivering high velocity jets across and substantially parallel to a windshield, and a plurality of valves rotating in said tube, connected by a drive shaft and arranged to open alternate nozzles simultaneously and in time sequence to adjacent nozzles.

3. In a windshield protector and cleaner, the combination of a stationary distributing tube provided with a plurality of nozzles for delivering high velocity jets across and substantially parallel to a windshield, a plurality of valves rotating in said tube and connected by a drive shaft, each valve having a port chamber covering substantially 180° and registering with the opening in the nipple and tube for one half a revolution of said valve, and arranged to open adjacent nipples in a regular time sequence.

4. In a windshield protector and cleaner, the combination of a curved distributing tube for fitting around a curved windshield, said tube provided with a plurality of nozzles for delivering high velocity jets across and substantially parallel to a windshield, and valve means rotatable in said tube alternately opening and cutting off the supply of high pressure fluid to said jets, and arranged to open adjacent nipples in a regular time sequence.

5. In a windshield protector and cleaner, the combination of a curved distributing tube for fitting around a curved windshield, said tube provided with a plurality of nozzles for delvering high velocity jets across and substantially parallel to a windshield, and valve means rotatable in said tube for alternately opening and cutting off the supply of high pressure fluid to said jets, the said valves being located at spaced points along the curved tube, one adjacent each nipple, and driven by a flexible shaft.

6. In a windshield protector and cleaner, the combination of a curved distributing tube for fitting around a curved windshield, said tube provided with a plurality of nozzles for delivering high velocity jets across and substantially parallel to a windshield, and valve means rotatable in said tube for alternately opening and cutting off the supply of high pressure fluid to said jets, the said valves being located at spaced points along the curved tube, one adjacent each nipple and staggered in cutting off and on in their operation.

WILLIAM N. PATTERSON.